United States Patent
Ment et al.

(10) Patent No.: US 7,268,511 B2
(45) Date of Patent: Sep. 11, 2007

(54) CONTROL FOR SERVO MOTORS

(75) Inventors: Harald Ment, Mittelstreu (DE); Markus Peschel, Muennerstadt (DE)

(73) Assignee: PREH GmbH, Bad Neustadt (DE)

( * ) Notice: Subject to any disclaimer, the term of this patent is extended or adjusted under 35 U.S.C. 154(b) by 0 days.

(21) Appl. No.: 11/446,172

(22) Filed: Jun. 5, 2006

(65) Prior Publication Data

US 2006/0290313 A1  Dec. 28, 2006

Related U.S. Application Data

(63) Continuation of application No. PCT/EP2004/013625, filed on Dec. 1, 2004.

(30) Foreign Application Priority Data

Dec. 5, 2003  (DE) ............................... 103 56 930

(51) Int. Cl.
*G05B 1/06* (2006.01)

(52) U.S. Cl. ............ 318/663; 318/264; 318/265; 318/266; 318/267; 318/286; 318/466; 318/467; 318/469; 318/652; 318/626

(58) Field of Classification Search ............ None
See application file for complete search history.

(56) References Cited

U.S. PATENT DOCUMENTS 4,679,591 A   7/1987  Maue et al.
5,947,086 A   9/1999  Hoshino et al.

FOREIGN PATENT DOCUMENTS

| DE | 197 04 867 | 8/1998 |
|---|---|---|
| GB | 1171214 | 11/1969 |
| JP | 57-150003 | 9/1982 |
| JP | 59-66719 | 4/1984 |

*Primary Examiner*—Lincoln Donovan
*Assistant Examiner*—Erick Glass
(74) *Attorney, Agent, or Firm*—McGrath, Geissler, Olds & Richardson, PLLC

(57) ABSTRACT

A drive arrangement for positioning a positioning element is disclosed that includes an electric servo motor for driving the positioning element, a potentiometer for presetting a setpoint, an actual value sensor disposed at the servo motor, and a motor driver with an integrated evaluation and control unit comparing the setpoint and actual value, whereby a pulse-shaped signal is superposed on the setpoint and the pulse-shaped signal exceeds the motor driver hysteresis in the evaluation and control unit.

10 Claims, 2 Drawing Sheets

(Conventional Art)

CONTROL FOR SERVO MOTORS

This nonprovisional application is a continuation of PCT/EP2004/013625, which was filed on Dec. 1, 2004, and which claims priority to German Patent Application No. DE 103 56 930, which was filed in Germany on Dec. 5, 2003, and which are both herein incorporated by reference.

BACKGROUND OF THE INVENTION

1. Field of the Invention

The present invention relates to a drive arrangement for positioning a positioning element with an electric servo motor for driving the positioning element, a potentiometer for setting a setpoint, an actual value sensor disposed at the servo motor, and a motor driver with an integrated evaluation and control unit, which compares the setpoint and actual value. In addition, the invention relates to a method for the electrical control of the movement of a positioning element, particularly of ventilation flaps in motor vehicles, in which a setpoint for controlling an evaluation and control unit containing a motor driver is transmitted and in which an actual value determined at a servo motor is detected in the evaluation unit and compared with the setpoint.

2. Description of the Background Art

Drive arrangements are provided for adjustment and positioning of ventilation flaps in a motor vehicle or used to move positioning elements in control systems or circuits.

A conventional drive arrangement uses stepper motors with gears and/or dc motors with a flange-mounted potentiometer at a gear output or dc gear motors with Hall sensors integrated into the motor. To prevent an inadvertent adjustment of the positioning element by external adjusting effects (in the case of a ventilation flap), for example, by the effect of the air current, in servo drives with a gear the latter is typically made self-locking.

The positioning of the positioning element in the stepper motor occurs by the stepwise driving and counting of the control pulses. In the dc motor provided with a potentiometer, the positioning is made by measuring the potentiometer voltage proportional to the setting angle, as is disclosed and described in DE 197 04 867 C1. The actuation of the dc motors arises with the aid of an adjustment potentiometer in the operating unit.

Difficulties in initiating a control of the servo motor by the adjustment potentiometer can occur when the adjustment potentiometer is changed only by a notch or a minimal amount. In this case, the difference between the setpoint and the actual value can be insufficiently large, so that the setpoint does not exceed the hysteresis of the motor driver and the servo motor is not activated.

SUMMARY OF THE INVENTION

It is therefore an object of the present invention to provide a circuit for improving the initiation of a control of a servo motor, which activates the servo motor independent of a hysteresis of the motor driver, even with minimal changes in the setpoint and thereby matches an actual value to the setpoint. In addition, the circuit is to be simple in structural terms and to be economic to manufacture. An object of the invention, furthermore, is to develop a method for controlling the motion of a positioning element, which exhibits good dynamics and responds to the smallest changes in the setpoint. Furthermore, the method is to be easy to adjust and to be integratable into any drive arrangements.

The object of the invention is achieved in that a pulse-shaped signal can be superposed on the setpoint and that a pulse-shaped signal exceeds the motor driver hysteresis in the evaluation and control unit. Thus, it is now possible to match the actual value to the setpoint with minimal adjusting motions of the adjustment potentiometer in the operating unit. By superposing a pulse-shaped signal on the setpoint, which in sum exceeds the hysteresis of the motor driver, the servo motor is activated immediately after the actuation of the adjustment potentiometer and the servo motor moves to a predefined, minimally different position. The setpoint and actual value are thereby matched again very rapidly. This rapid matching or better dynamics of the circuit are an advantage of the idea of the invention. In particular, by using an oscillator integrated into a binary counter, on the one hand, the frequency of the pulse sequence can be varied and, moreover, the duration of the superposition can be varied by the binary counter. In another embodiment, another circuit, which includes a pulse shaper and a coupling circuit, can be connected downstream to the frequency-determining counting unit. The pulse length can be varied by the pulse shaper and the positive pulses can be uncoupled by the coupling circuit. Here, the pulse shaper is formed substantially of an RC element and the coupling circuit includes a diode.

In terms of process technology, the object is achieved to the effect that with each adjustment of the potentiometer, a counting unit with an integrated oscillator is activated and the setpoint is superposed with a pulse-shaped signal, corresponding to the frequency generated in the oscillator and exceeding the hysteresis in the evaluation and control unit. A motor driver can now be activated with minimal expense even at the smallest setpoint changes. With the actuation of the adjustment potentiometer in the operating unit, a counting unit with an integrated oscillator is activated. The frequency generated in the oscillator is thereby superposed on the setpoint output by the adjustment potentiometer. Thereby, the frequency can be set by the binary counter present in the counting unit or as described in another embodiment variant, modulated by a downstream pulse shaper and coupling circuit. The pulse-shaped signal superposed on the setpoint thereby is used only for servo motor activation. By means of the method of the invention, an available electric control for moving a positioning element is improved to the effect that the circuit responds much more dynamically and more sensitively to changes in the setpoint.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
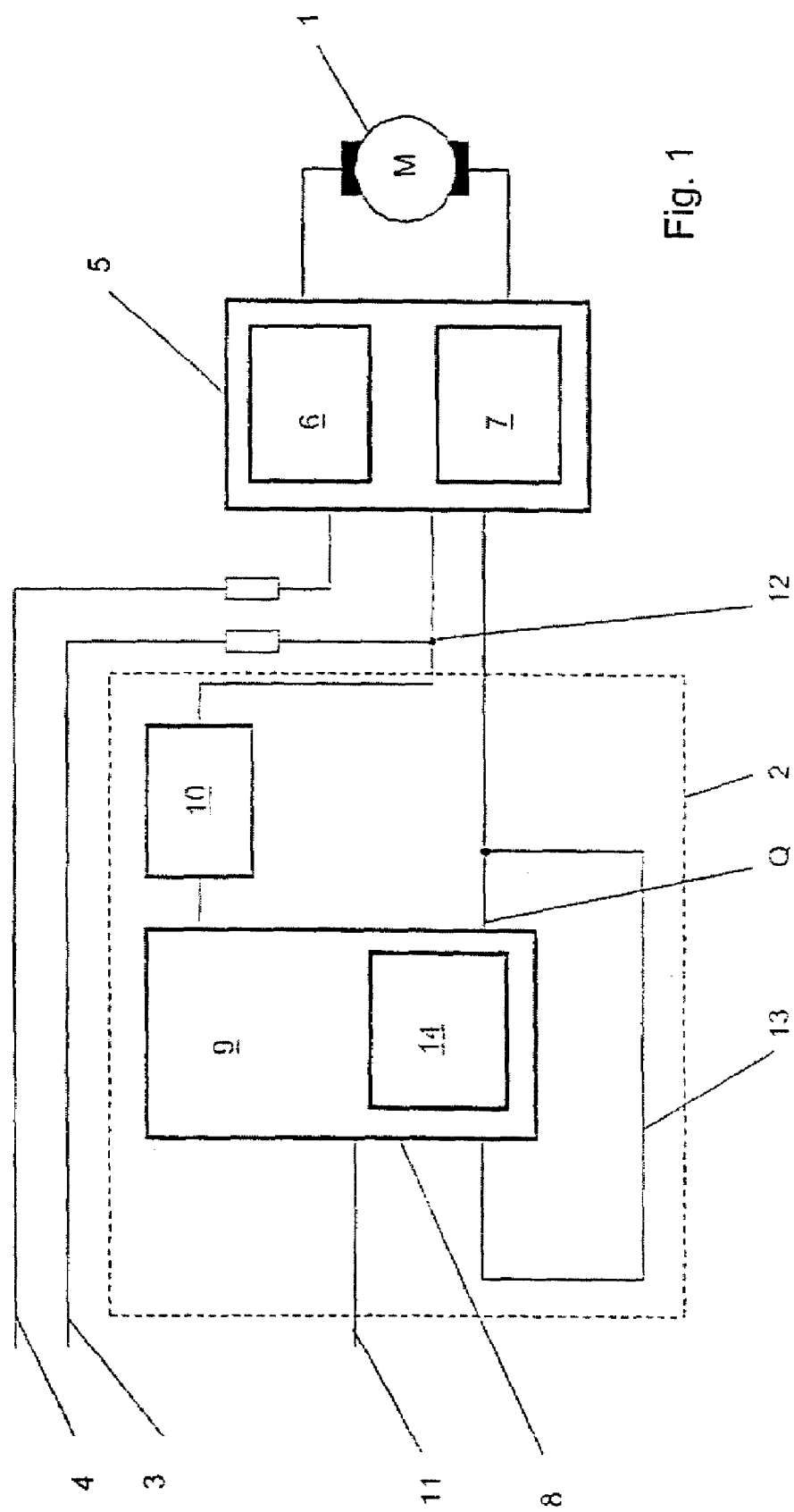
FIG. 1 illustrates a basic structure of a circuit for a drive arrangement for positioning a positioning element, according to an embodiment of the present invention.

FIG. 1 shows a basic structure of a circuit for controlling a servo motor 1 with an integrated auxiliary circuit 2. The circuit includes a lead for setpoint 3, which comes from an adjustment potentiometer (not shown) in the operating unit, another line which transmits the actual value 4, a switching unit 5 with an integrated motor driver 6 and an evaluation unit 7 for comparing the setpoint and actual value, and a servo motor 1, which is connected to the switching unit 5. The auxiliary circuit 2 comprises a counting unit 8, which includes a binary counter 9 and a pulse shaper and coupling circuit 10, connected downstream of the counting unit 8. Via lead 11, counting unit 8 is connected to the adjustment potentiometer for setpoint 3, so that immediately after actuation of the operating element of the adjustment potentiometer a start pulse is transmitted via lead 11 to counting unit 8. The signal initiated in counting unit 8 via pulse shaper and coupling circuit 10 reaches linkage point 12, in which the generated signal is superposed on setpoint 3. In addition, auxiliary circuit 2 comprises a feedback 13 by which the counting unit 8 is deactivated after a time settable by the binary counter 9. This deactivation signal of feedback 13 is also transmitted to switching unit 5, as a result of which motor driver 6 is also deactivated.

A modified setpoint 3 is now set via the adjustment potentiometer, so that hereby a signal is simultaneously transmitted to counting unit 8 via lead 11. A frequency is now generated in counting unit 8 by an oscillator 14 integrated into binary counter 9. Binary counter 9 has several outputs Q from which a pulse-shaped signal, in each case dividing the frequency by a factor $2^n$, is output. Here, n stands for the specific output Q at binary counter 9. If now, for example, a frequency of 400 Hz is generated in the oscillator and the fifth output at the binary counter is tapped, a tappable frequency thus results from the calculation of 400 Hz:$2^4$, which corresponds to a frequency of 25 Hz. This frequency corresponds to a pulse sequence of 20 ms to 20 ms. In the circuit diagram shown in this exemplary embodiment, this pulse sequence is supplied to the downstream pulse shaper and coupling circuit 10. Here, the pulse sequence can be minimized to preferably 100 μs, for example, via an RC element and the positive pulses can be uncoupled by a diode. A still more preferred pulse has a pulse length of 10 μs. This signal modulated in pulse shaper 10 and in coupling circuit 10 is superposed on the newly set setpoint 3 in linkage point 12 and supplied to motor driver 6 in the switching unit 5. If the setpoint change in the adjustment potentiometer of the operating device was now so small that the setpoint change was not sufficient to exceed the hysteresis of the motor driver 6, the voltage peaks of the pulses superposed on the setpoint go beyond the hysteresis and thereby activate motor driver 6. This in turn leads to a change in the actual value of servo motor 1 and as a result also to a matching of the actual value to the setpoint. The addition of auxiliary circuit 2, according to the invention, to the drive arrangement for servo motor 1 thereby offers the advantage that even the smallest changes in setpoint 3 lead to the activation of servo motor 1.

In addition to the pulse-shaped signal, which is taken from binary counter 9 for supplying a pulse above setpoint 3, a signal that leads to the deactivation of counting unit 8 is also picked up from binary counter 9 at one of its outputs. This additional picked up signal is fed back 13, on the one hand, and supplied to switching unit 5 and motor driver 6, on the other. The signal of feedback 13 stops the counting unit, on the one hand, and the signal, on the other hand, causes motor driver 6 to be deactivated. Depending on the selected output at binary counter 9, thereby the duration of the superposition of the setpoint by the pulse-shaped signal can be set.

Figure 2:
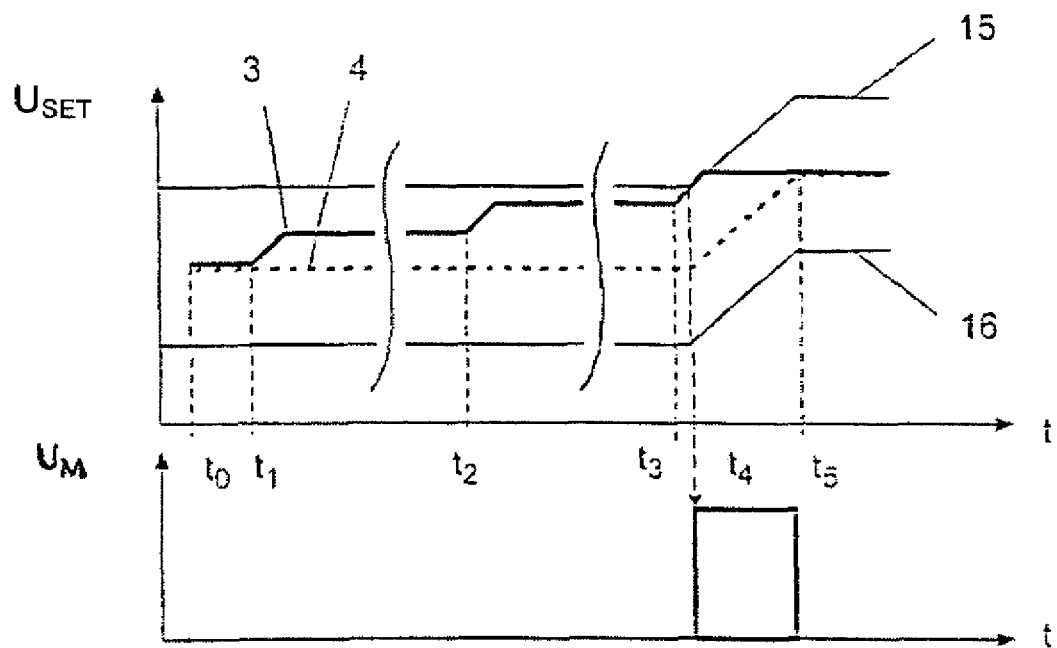
FIG. 2 shows a course of a setpoint/actual value of a control circuit according to the conventional art.

To illustrate the mode of operation of a driver component 6 in regard to the minimal changes in the setpoint, two diagrams are depicted in FIG. 2, whereby the top diagram shows the course of setpoint 3 as an absolute voltage value over time. The bottom diagram in FIG. 2 shows the voltage curve $U_M$ at servo motor 1, which is plotted over time t. In the top diagram, the hysteresis of driver component 5 is also shown in its upper 15 and lower 16 limits. In addition, the course of actual value 4 is plotted on the diagram as a broken line. At time $t_0$ servo motor 1 is in an idle state. At time $t_1$, the setpoint potentiometer is actuated by the operator by means of the operating device, whereby the setpoint is changed by a minimal amount. In order to present here an illustration of the magnitude of the applied voltages a setpoint change of about 40 mV can be assumed, which corresponds to a notch on the operating element or, without a locking device, to a minimal adjustment of the operating element. The hysteresis of motor driver 6 can have, for example, a value of about 100 mV as the upper deviation from the setpoint. The setpoint change at time $t_2$, thus does not go beyond the hysteresis of motor driver 6; consequently, servo motor 1 is not activated. Even the again minimal change in the setpoint at time $t_2$ does not go beyond the hysteresis of driver component 6, so that servo motor 1 is again not activated. The upper hysteresis limit is exceeded only after another change in the setpoint at time $t_3$ and servo motor 1 is activated. At this time $t_4$, the actual value follows the setpoint up to a time $t_5$, at which the actual value is again matched to the setpoint. For this time period $t_4$ to $t_5$, the motor voltage $U_M$ is shown as a function of time in the bottom diagram of FIG. 2. It is pointed out below that the matching of the setpoint and actual value, which have an equally high voltage in this diagram, is possible but not imperative. Rather, this diagram is intended to show the difference between setpoint 3 and actual value 4, without the voltage values of the setpoint and actual value 3, 4 having to correspond in their absolute values. This applies particularly also to the diagram in FIG. 3. The top diagram in FIG. 2 represents the conventional art, in which the actual value follows the setpoint only after a very great change in the setpoint. This disadvantage can be eliminated according to the use of the auxiliary circuit according to the invention to control servo motor 1. A corresponding course of setpoint and actual values is shown in FIG. 3.

Figure 3:
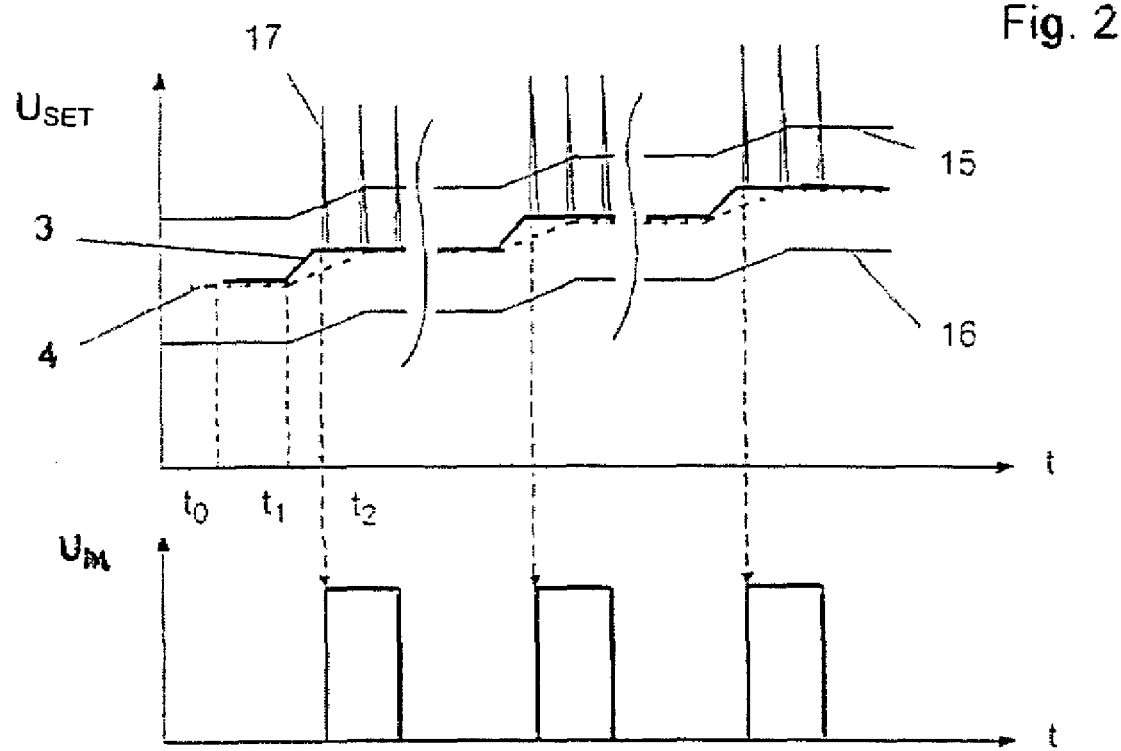
FIG. 3 is a diagram illustrating the course of the setpoint/actual value of a control circuit with an integrated auxiliary circuit according to an embodiment of the invention.

FIG. 3 shows the pulse and action diagram of a circuit provided with an auxiliary circuit according to the invention to improve the initiation of the control of servo motor 1. The top diagram in FIG. 3 again shows the course of setpoint 3 and the deviations of actual value 4, as a broken line, as well as the upper 15 and lower 16 limits of the hysteresis of driver component 6. In addition, the diagram shows pulses 17 superposed on setpoint 3 by the auxiliary circuit 2. At time $t_{01}$, the positioning elements and/or servo motor 1 are in the idle state. At time $t_1$, the setpoint of the setpoint potentiometer is again changed by the operating device by the operator by an amount of, for example, 40 mV. As already described in FIG. 1, counting unit 8 is activated via lead 11 and a pulse-shaped signal 17 is superposed on setpoint 3. Because pulse-shaped signal 17 of the invention is greater than the maximum difference between setpoint 3 and upper limit 15 of the hysteresis, pulse-shaped signal 17 goes beyond the hysteresis of driver component 6 and motor driver 6 is released to control servo motor 1. As shown in the bottom diagram of FIG. 3, servo motor 1 is now supplied with the voltage $U_M$ at time $t_2$. It is also clearly evident that the superposition of the pulse-shaped signals ends with the matching of the setpoint and actual value 3, 4, because motor driver 6 is turned off at this time. According to the invention, even with the minimum changes in setpoint 3, this assures that servo motor 1 follows the changes of setpoint 3. Actual value 4 is thereby matched very rapidly to the newly set setpoint. These very good dynamics of the matching of the setpoint and actual value is another advantage of the invention. It is naturally understood that with an adjustment of the setpoint potentiometer in the opposite direction, servo motor 1 moves in the opposite direction, whereby pulse-shaped signals 17 are also superposed on setpoint 3 and are used for measuring the initiation of the control of servo motor 1.

In regard to the actual course, during actuation of the setpoint potentiometer a reset is triggered at binary counter 9; thereby, all outputs are changed to Low, the time is started, and driver component 6 released. In so doing, the time and/or the duration for supplying pulse-shaped signals 17 with a setpoint 3, as described, via the tapped output, are set at binary counter 9. Depending on the tapped output at binary counter 9, the duration of the supplying can thereby be varied. If the preset time has now elapsed, the output Q is set to High. This High signal is transmitted, on the one hand, to downstream switching unit 5 and thereby to motor driver 6 and, on the other, supplied via feedback 13 as input to counting unit 8. The High signal, on the one hand, now causes motor driver 6 to be deactivated and, on the other hand, counting unit 8 is turned off via feedback 13. The time thereby is set to a maximum value, which takes into account the maximum adjustment time of the positioning element, as described below. After the matching of the setpoint and actual value 3, 4 is detected by evaluation unit 7, motor driver 6 is again turned off.

At a maximum adjustment of the positioning element by the servo motor 1, i.e., when the setpoint potentiometer is adjusted from its zero position to the end stop by movement of the operator, this maximum travel time of servo motor 1 is thus a measure for the maximum duration of the generated pulse from counting unit 8. The output of binary counter 9 to feedback 13, i.e., to stop counting unit 8, is selected according to the invention in such a way that the output signal for deactivating counting unit 8 occurs after a time after which servo motor 1 would have been able to travel from an end stop, i.e., totally opened, up to its other end stop, i.e., totally closed.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A drive arrangement for positioning a positioning element, the drive arrangement comprising:
    an electric servo motor for driving the positioning element;
    a potentiometer for providing a setpoint;
    an actual value sensor disposed at the electric servo motor provided; and
    a motor driver having an integrated evaluation and control unit for comparing the setpoint and an actual value;
    wherein a pulse-shaped signal is superposed on the setpoint, and
    wherein the pulse-shaped signal exceeds a motor driver hysteresis.

2. The drive unit according to claim 1, wherein the pulse-shaped signal is superposed on the setpoint with a presettable frequency.

3. The drive unit according to claim 1, wherein the frequency of the pulse-shaped signal is generated by an oscillator, and wherein the generated signal is changed by a downstream pulse shaper and coupling circuit.

4. The drive unit according to claim 3, wherein the oscillator is part of a binary counter and a duration of the superposition can be set by the binary counter.

5. The drive unit according to claim 4, wherein the duration of the superposition of the setpoint with the pulse-shaped signal is longer than a maximum possible travel time of the servo motor.

6. A method for controlling a movement of a positioning element, the method comprising the steps of:
    providing from a potentiometer a setpoint for controlling an evaluation and control unit that includes a motor driver;
    detecting, in the evaluation and control unit an actual value that is determined at the servo motor;
    comparing the actual value with the setpoint;
    activating a counting unit having an integrated oscillator with an adjustment of the potentiometer; and
    superposing the setpoint with a pulse-shaped signal corresponding to a frequency generated in the oscillator, the pulse-shaped signal exceeding a motor driver hysteresis in the evaluation and control unit.

7. The method according to claim 6, wherein a duration of the superposition of the setpoint with the pulse-shaped signal is set by a binary counter.

8. The method according to claim 6, wherein the pulse-shaped signal generated in the oscillator is shortened and rectified by a downstream pulse shaper and coupling circuit.

9. The method according to claim 6, wherein the actual value is determined measuring a potentiometer voltage proportional to a setting angle.

10. The method according to claim 6, wherein the positioning element is a ventilation flap of a motor vehicle.

* * * * *